Aug. 30, 1960 C. J. ESVELDT ET AL 2,951,042
METHOD OF MANUFACTURING FERROMAGNETIC
BODIES AND PRODUCTS THEREOF
Filed March 27, 1956 5 Sheets-Sheet 1

INVENTOR
CORNELIS JACOBUS ESVELDT
HENDRIK VAN DER HEIDE
HENRICUS PETRUS JOHANNES WIJN
BY
AGENT

United States Patent Office 2,951,042
Patented Aug. 30, 1960

2,951,042

METHOD OF MANUFACTURING FERROMAGNETIC BODIES AND PRODUCTS THEREOF

Cornelis Jacobus Esveldt, Hendrik van der Heide, and Henricus Petrus Johannes Wijn, all of Eindhoven, Netherlands, assignors, by mesne assignments, to North American Philips Company, Inc., New York, N.Y., a corporation of Delaware Filed Mar. 27, 1956, Ser. No. 574,150

Claims priority, application Netherlands Mar. 28, 1955

7 Claims. (Cl. 252—62.5)

Our invention relates to a method of manufacturing a ferromagnetic body comprising cobalt ferrous ferrite.

More particularly our invention relates to a method for manufacturing magnet cores suitable for use in the devices described by W. N. Papian (Proceedings of the Institute of Radio-Engineers, April 1952, pages 475–478) and by D. R. Brown and E. Albers Shoenberg (Electronics, April 1953, pages 147–149). The magnet cores used for these devices are required to have a "squareness ratio," $(R_s)_{max}$ whose value approaches 1 as near as possible.

Figure 1:
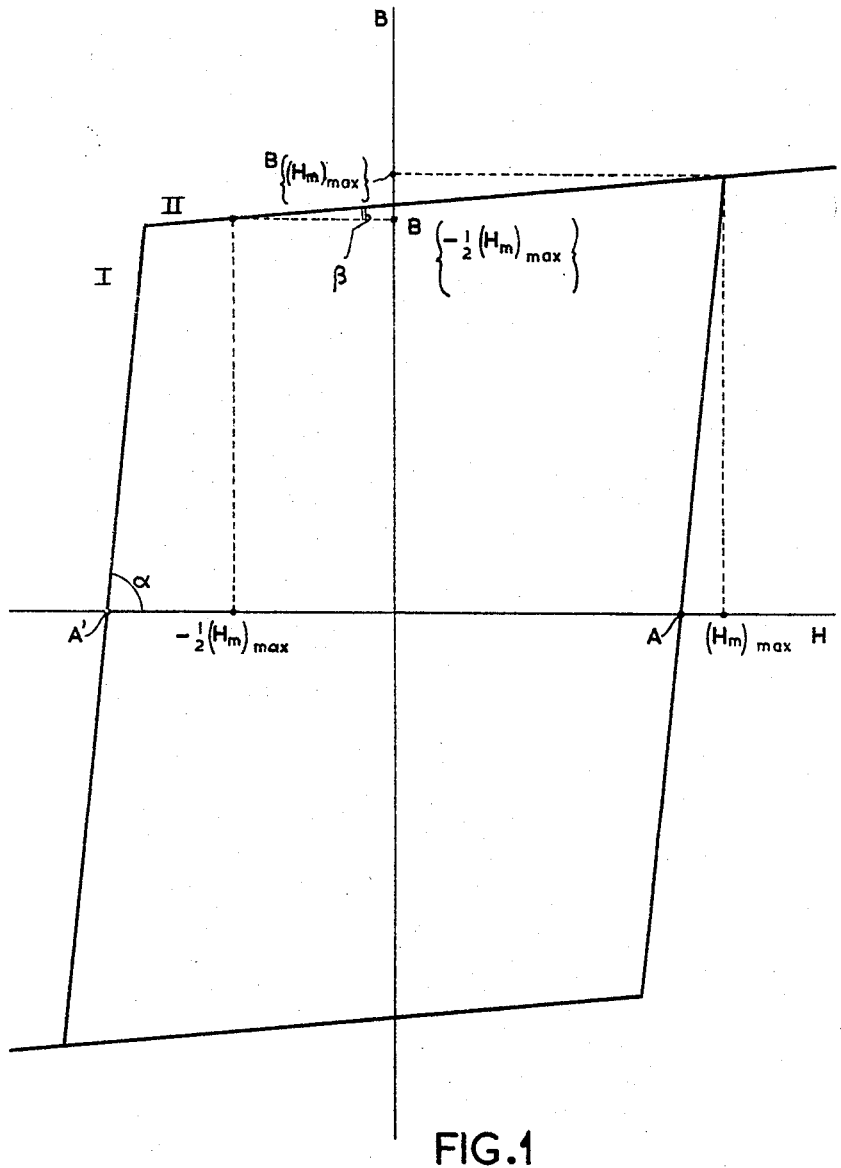

Fig. 1 is a magnetization curve showing the relationship of certain values referred to hereinafter. Figs. 2 to 5 are magnetization curves of materials made in accordance with the invention.

For the meaning of the magnitude $(R_s)_{max}$ reference is made to the literature mentioned above. For completeness' sake a brief explanation is given hereinafter with reference to Fig. 1, a diagrammatical representation of part of a magnetizing curve relating to a case in which the demagnetization started before the magnetic saturation had been reached. The magnitude $(R_s)_{max}$ is defined by:

$$\frac{B_{(-1/2H_m)}}{B_{(H_m)max}}$$

The quotient $$\frac{B_{(-1/2H_m)}}{B_{(H_m)}}$$

is a function of the maximum field-strength $H_m$, applied during magnetization. It is found that this quotient has a maximum value at a particular value of $H_m$, which, as a rule, differs little from the coercivity $H_c$. This maximum value of the quotient is indicated by the symbol $(R_s)_{max}$. The measurements of $B_{(H_m)}$ and $B_{(-1/2H_m)}$ required to determine $(R_s)_{max}$ were made, when the invention was done, on annular magnet cores having a constant section of ferromagnetic material throughout the periphery of the ring and an outer diameter of not more than 1.6 times the inner diameter.

With devices of the aforesaid kind not only the squareness ratio $(R_s)_{max}$ is important, but also a high value of the ratio between the flank steepnesses of the branches I and II of the hysteresis loop. This ratio is defined by the quotient:

$$\frac{\tan \alpha}{\tan \beta}$$

(see also Fig. 1).

Not only for the aforesaid devices, but also, for example, for magnetic drums, for recording coded information and, furthermore, for chokes to limit power, the inductance of which increases very strongly and abruptly, when the current passing the coil exceeds a prescribed value, use may be made of the bodies manufactured in accordance with the invention. The bodies produced in accordance with the invention may, moreover, have an asymmetrical hysteresis loop, so that the coercivity measured in one direction differs from that measured in the other direction, which may be of importance for certain uses. It is important also for these applications that the coercivity should not assume an excessively high value and should remain at least below 100 Oersted.

As these rectangular hysteresis loop ferromagnetic materials are almost always used with alternating currents of high frequencies it is important to minimize the occurrence of eddy currents. In the past attempts have been made to solve this problem by building up magnet cores from insulated, very thin layers of ferromagnetic materials. For high frequencies it was necessary to use as the raw material for the magnet cores a magnetically weak, ferric oxide material having a spinel structure. However, even with the use of these magnetically weak materials, it has been very difficult to manufacture magnet cores having approximately rectangular hysteresis loops.

A principal object of our invention, therefore, is to provide a more satisfactory method for the preparation of rectangular hysteresis loop magnet cores.

A second principal object of my invention is to provide a process for the preparation of magnet cores having a combination of better magnetic properties and a more rectangular hysteresis loop than was formerly obtainable.

Another object of our invention is to provide a magnet core having a high value of the aforementioned ratio $$\frac{\tan \alpha}{\tan \beta}$$

It is a further object of our invention to provide a magnet core having an asymmetrical hysteresis loop in which the coercivity measured in one direction differs from the coercivity measured in the other direction.

According to our invention a ferromagnetic body is produced from cobalt ferrous ferrite in which $$(R_s)_{max} \geq 0.85$$

and $H_c < 100$ Oersted. More particularly our method involves the steps of sintering a mixture, moulded in the desired form, of at least one cobalt pound and at least one iron compound (oxides and/or compounds capable of producing oxides by heating) in a composition according to an atomic ratio of Co:Fe between 0.007:1 and 0.4:1 in reducing conditions at a temperature exceeding 1200° C., until a body having a pore volume of not more than 10%, i.e., a body whose density is at least 90% of theoretical density has been obtained, cooling this body to about room temperature and then treating the cooled body by heating it to a temperature of more than 250° C., and finally cooling this body in a direct or alternating magnetic field. The last-mentioned aftertreatment is described for other ferromagnetic material in Electrical Engineering, May 1951, pages 420–421.

The term "reducing conditions," referred to above, is to be understood to mean herein conditions, in which part of the iron gets into or remains in the bivalent condition. Whether we are concerned with "reducing conditions" or not, depends upon the oxygen dissociation pressure of the reaction mass and upon the partial oxygen pressure of the ambient gas atmosphere. At a sufficient high sintering temperature (for example of 1450° C.) oxygen of a pressure of 1 atmosphere may, in this sense, be a reducing condition, since at these high temperatures the oxygen dissociation pressure of the reaction mass is, as a rule, more than 1 atmosphere.

The invention will be described with reference to a few embodiments.

Example I

A mixture of cobalt oxide and iron oxide in a ratio of 0.36 gram atom of cobalt on 1 gram atom of iron is moulded to rings, which are heated for two hours at 1450° C. in air and then cooled to room temperature. According to a chemical analysis the product thus obtained contains 2.9% by weight of bivalent iron. The $(R_s)_{max}$ of the sintered bodies appears to be negative. The rings are then heated in air to 600° C. and cooled in a direct magnetic field of about 100 Oersted. The $(R_s)_{max}$ of the rings thus treated is between 0.85 and 0.90 and the coercivity $H_c$ is about 45 Oersted.

Example II

Figure 2:
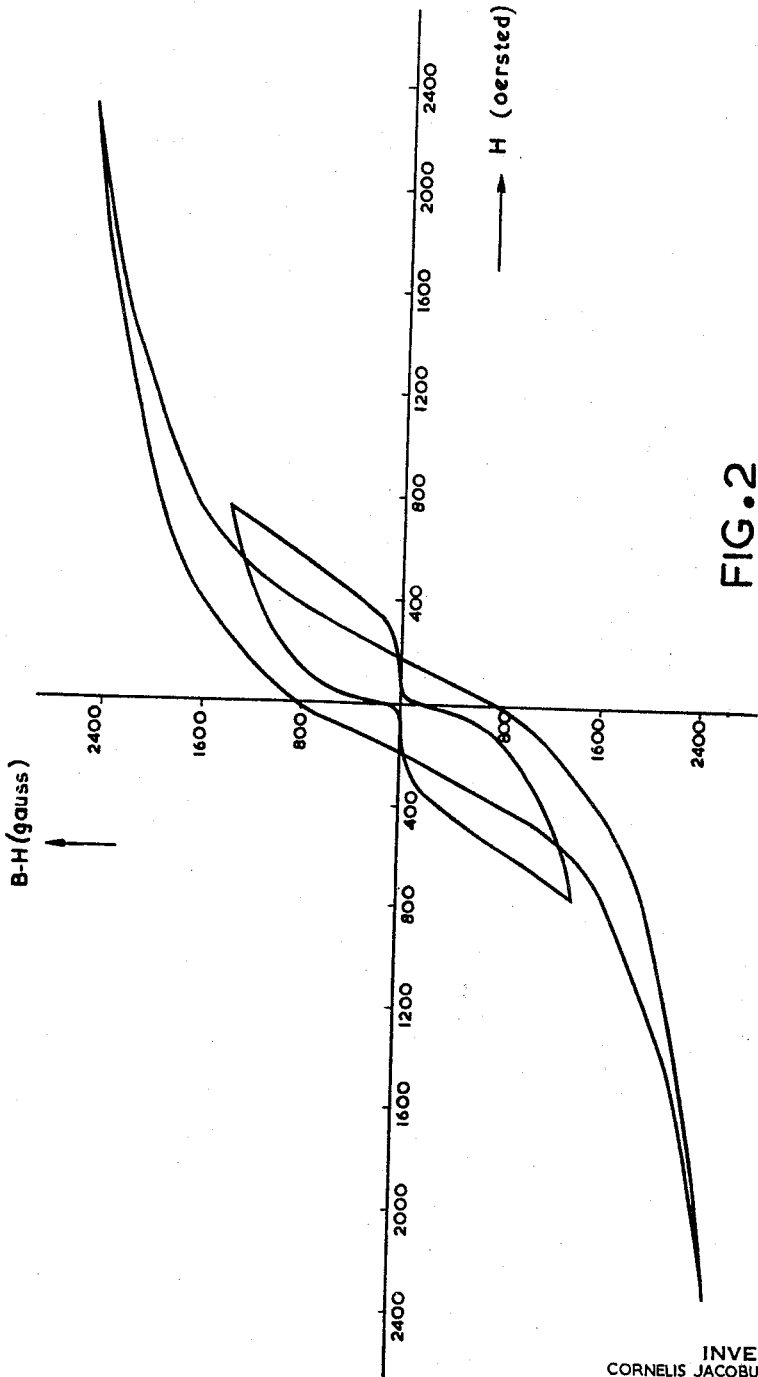
Figure 3:
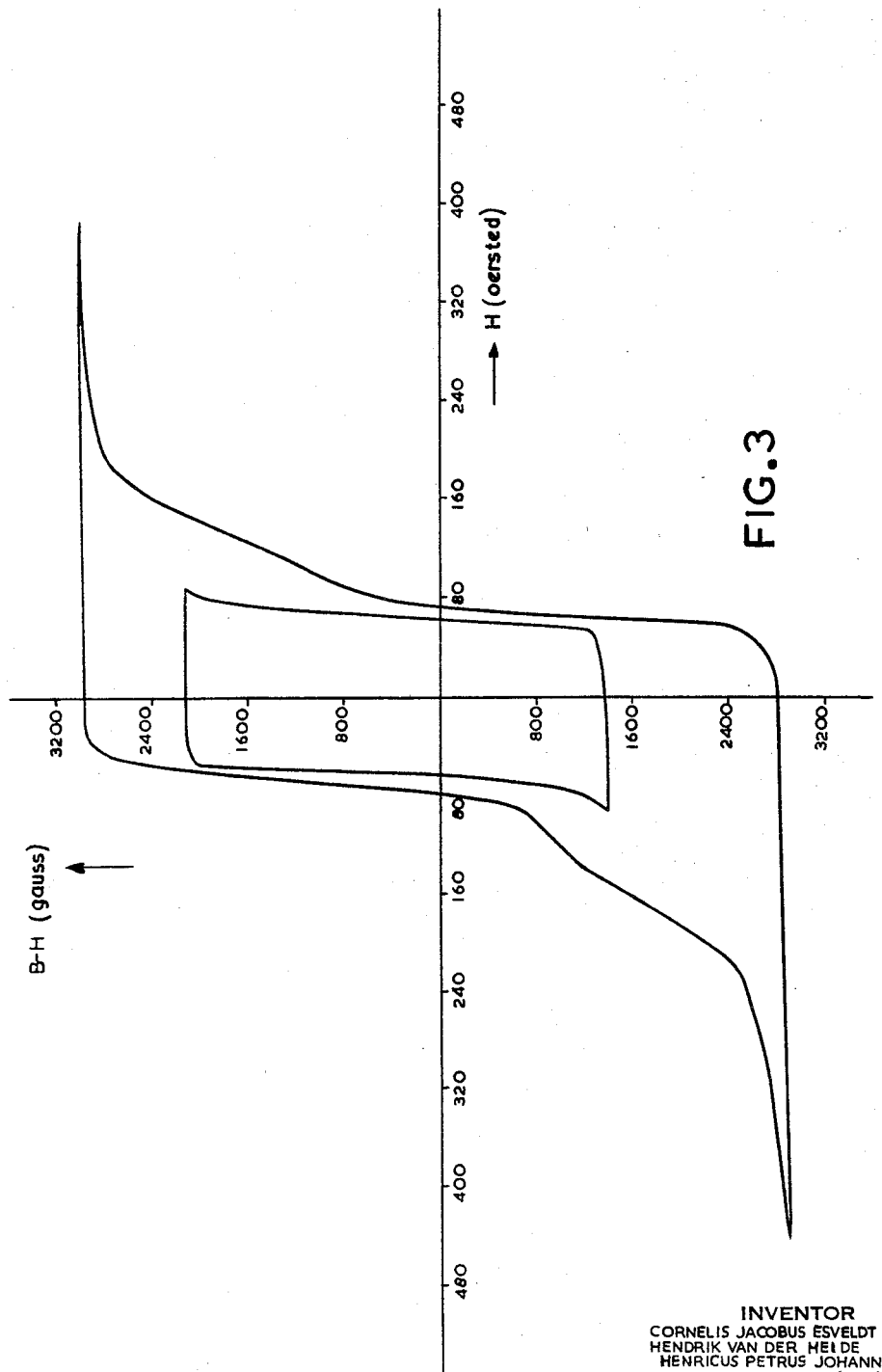

A mixture of cobalt oxide and iron oxide in the ratio of 0.25 gram atom of cobalt on 1 gram atom of iron is moulded to obtain rings which are heated for two hours at 1450° C. in oxygen under a pressure of 1 atmosphere and then cooled. The product thus obtained contains 8.3% by weight of bivalent iron and has a pore volume of 3.6%. At room temperature the rings exhibit strongly grooved hysteresis loops at a maximum field strength of less than about 1000 Oersted. Fig. 2 shows such a hysteresis loop, as well as hysteresis loop for much higher field strengths up to more than 2000 Oersted. The $(R_s)_{max}$ of the rings is now found to be approximately zero. Then the rings are heated in air to about 600° C. and then cooled in a direct magnetic field of about 80 Oersted. The hysteresis loops of the rings thus treated are shown in Fig. 3. The value of $(R_s)_{max}$ has increased to about 0.95. The coercivity $H_c$ is now about 80 Oersted.

Example III

A mixture of cobalt oxide and iron oxide in the ratio of 0.15 gram atom of cobalt on 1 gram atom of iron is moulded to obtain rings, which are heated for two hours in a gas stream of 80% by volume of carbon dioxide, 18% by volume of nitrogen and 2% by volume of hydrogen to 1350° C., after which they are cooled. The product thus obtained contains 14.0% by weight of bivalent iron and the pore volume is 3.0%. At room temperature the rings exhibit grooved hysteresis loops according to those shown in Fig. 2. The $(R_s)_{max}$ of the rings is in this case negative. Then the rings are heated in carbon dioxide to about 600° C. and then cooled in an alternating magnetic field of 60 Oersted. The $(R_s)_{max}$ of the rings is then found to be 0.90 at field strengths between 30 and 60 Oersted.

Example IV

A mixture of cobalt oxide and iron oxide in a ratio of 0.03 gram atom of cobalt on 1 gram atom of iron is moulded to obtain rings, which are heated for two hours at 1350° C. in a gas stream of a composition of 75% by volume of carbon dioxide, 22.5% by volume of nitrogen and 2.5% by volume of hydrogen and then cooled. The product thus obtained has a content of 22% by weight of bivalent iron and a pore volume of 1.5%.

Figure 4:
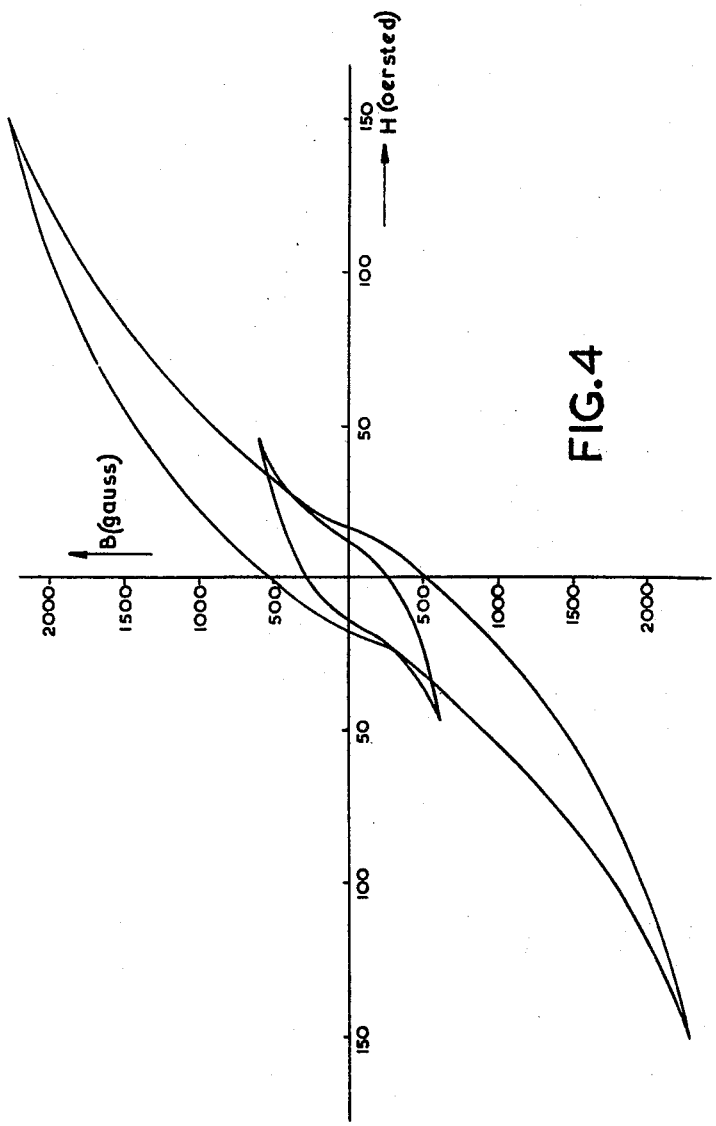
Figure 5:
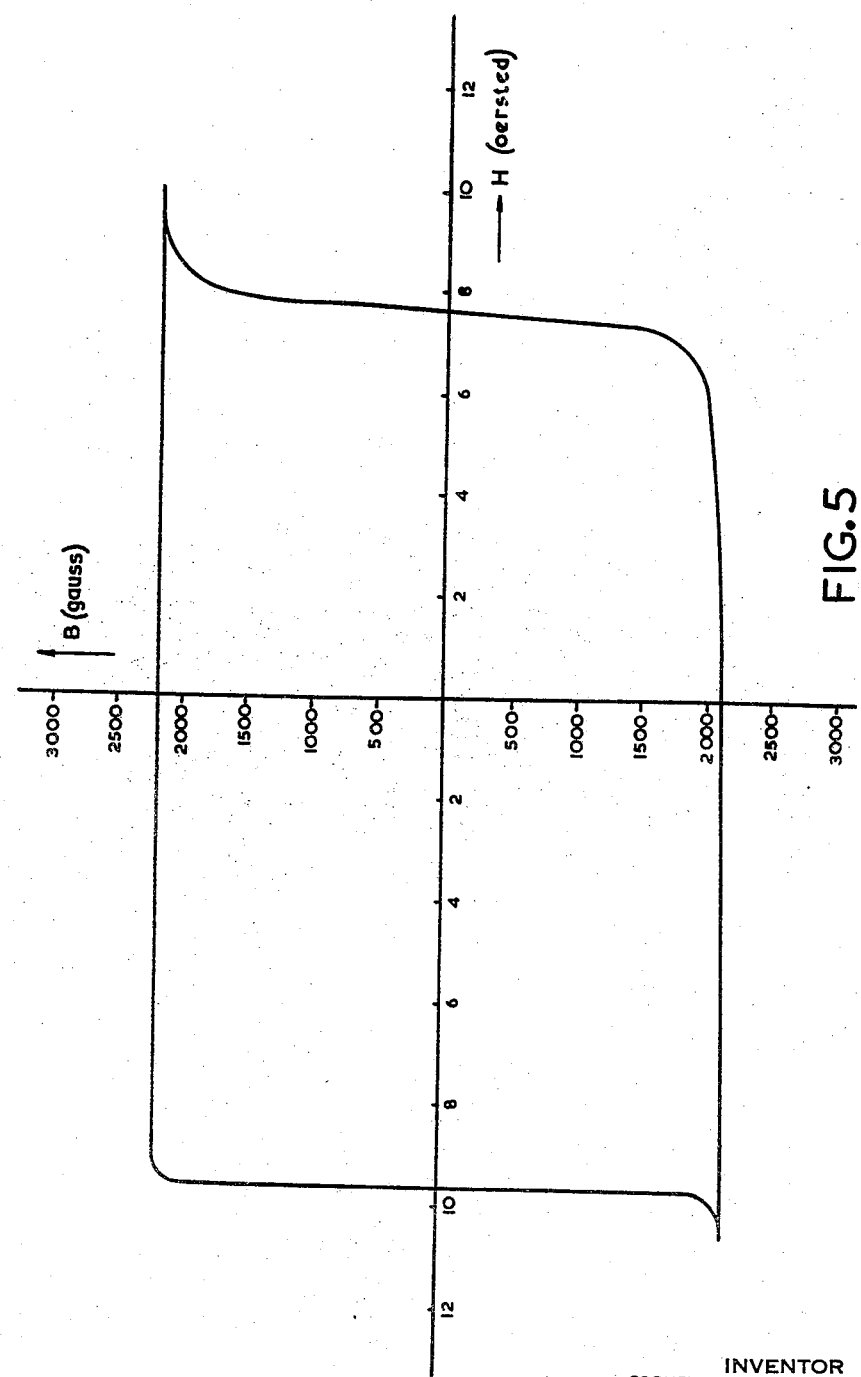

For two different amplitudes of the field strength Fig. 4 shows hysteresis loops of the rings produced. It is found that $(R_s)_{max}$ is about zero. The rings are heated in carbon dioxide to 600° C. and then cooled in a direct magnetic field of about 35 Oersted. A hysteresis loop of a ring thus after-treated is shown in Fig. 5. The $(R_s)_{max}$ then has a value of about 0.95 and the coercivity is 9.5 Oersted.

Example V

A mixture of cobalt oxide and iron oxide in a ratio of 0.017 gram atom of cobalt on 1 gram atom of iron is moulded to obtain rings, which are heated for two hours to 1350° C. in a gas stream of 8.3% by volume of carbon dioxide, 15.3% by volume of nitrogen and 1.4% by volume of hydrogen and then cooled. The sintered bodies thus obtained are found to have an $(R_s)_{max}$ of 0.25. The content of bivalent iron is 24% by weight and the pore volume is 3.6%. One of the rings is then heated in carbon dioxide to about 600° C. and then cooled in a direct magnetic field of about 50 Oersted. Owing to this treatment the $(R_s)_{max}$ of the ring is found to have increased to 0.99. The coercivity of the ring is 7 Oersted. A further ring is heated in carbon dioxide to 600 C. and cooled in an alternating magnetic field of 160 Oersted. The ring thus treated exhibits an $(R_s)_{max}$ of 0.95 and a coercivity of 5 Oersted.

While we have described our invention in connection with specific embodiments and applications, other modifications thereof will be readily apparent to those skilled in this art without departing from the spirit and scope of the invention as defined in the appended claims.

What is claimed is:

1. A ferromagnetic ferrite body having a substantially square hysteresis loop formed by firing a compacted mixture of cobalt and iron oxides in proportions at which the atomic ratio Co:Fe is between about 0.007:1 and 0.4:1 at a temperature of about 1350° to 1450° C. under reducing conditions to form a coherent body having a density exceeding 90% of theoretical density, and cooling said body from a temperature exceeding 250° C. in a magnetic field to thereby form a body having an $(R_s)_{max}$ of at least 0.85 and a coercive force of not more than 100 oersted.

2. A method of manufacturing a ferromagnetic ferrite having a substantially square hysteresis loop comprising the steps, forming a compacted mixture of cobalt and iron oxides in proportions at which the atomic ratio Co:Fe is between about 0.007:1 and 0.4:1, heating said mixture to a temperature of about 1350° to 1450° C. under reducing conditions to form a coherent body having a density not less than 90% of theoretical density, and cooling said body from a temperature exceeding 250° C. in a magnetic field whereby a body is formed having an $(R_s)_{max}$ of at least 0.85 and a coercive force not exceeding 100 oersted.

3. A method of manufacturing a ferromagnetic ferrite having a substantially square hysteresis loop comprising the steps, forming a compacted mixture of cobalt and iron oxides in proportions at which the atomic ratio Co:Fe is between about 0.007:1 and 0.4:1, heating said mixture to a temperature of about 1350° to 1450° C. under reducing conditions to form a coherent body having a density not less than 90% of theoretical density, and cooling said body from a temperature of about 600° C. in a magnetic field whereby a body is formed having an $(R_s)_{max}$ of at least 0.85 and a coercive force not exceeding 100 oersted.

4. A method of manufacturing a ferromagnetic ferrite having a substantially square hysteresis loop comprising the steps, forming a compacted mixture of cobalt and iron oxides in proportions at which the atomic ratio Co:Fe is between about 0.007:1 and 0.4:1, heating said mixture to a temperature of about 1350° to 1450° C. under reducing conditions to form a coherent body having a density not less than 90% of theoretical density, heating said body to a temperature of about 600° C. in an atmosphere of carbon dioxide, and cooling said body in a magnetic field whereby a body is formed having an $(R_s)_{max}$ of at least 0.85 and a coercive force not exceeding 100 oersted.

5. A method of manufacturing a ferromagnetic ferrite having a substantially square hysteresis loop comprising the steps, forming a compacted mixture of cobalt and iron oxides in proportions at which the atomic ratio Co:Fe is between about 0.007:1 and 0.4:1, heating said mixture to a temperature of about 1350° to 1450° C. in an oxygen atmosphere to form a coherent body having a density not less than 90% of theoretical density, heating said body to a temperature of about 600° C. in an atmosphere of carbon dioxide, and cooling said body in a magnetic field whereby a body is formed having an $(R_s)_{max}$ of at least 0.85 and a coercive force not exceeding 100 oersted.

6. A method of manufacturing a ferromagnetic ferrite having a substantially square hysteresis loop comprising the steps, forming a compacted mixture of cobalt and iron oxides in proportions at which the atomic ratio Co:Fe is between about 0.007:1 and 0.4:1, heating said mixture to a temperature of about 1350° to 1450° C. in an atmosphere of carbon dioxide, nitrogen and hydrogen to form a coherent body having a density not less than 90% of theoretical density, and cooling said body from a temperature exceeding 250° C. in a magnetic field whereby a body is formed having an $(R_s)_{max}$ of at least 0.85 and a coercive force not exceeding 100 oersted.

7. A method of manufacturing a ferromagnetic ferrite having a substantially square hysteresis loop comprising the steps, forming a compacted mixture of cobalt and iron oxides in proportions at which the atomic ratio Co:Fe is between about 0.007:1 and 0.4:1, heating said mixture to a temperature of about 1350° to 1450° C. in an atmosphere of carbon dioxide, nitrogen, and hydrogen to form a coherent body having a density not less than 90% of theoretical density, heating said body to a temperature of about 600° C. in an atmosphere of carbon dioxide, and cooling said body in a magnetic field whereby is formed having an $(R_s)_{max}$ of at least 0.85 and a coercive force not exceeding 100 oersted.

References Cited in the file of this patent

UNITED STATES PATENTS

| | | |
|---|---|---|
| 2,723,239 | Harvey | Nov. 8, 1955 |
| 2,736,708 | Crowley et al. | Feb. 28, 1956 |

FOREIGN PATENTS

| | | |
|---|---|---|
| 697,059 | Great Britain | Sept. 16, 1953 |
| 1,089,564 | France | Oct. 6, 1954 |

OTHER REFERENCES

Harvey et al.: RCA Review, September 1950, pp. 344–347.

"Philips Technical Review," vol. 16, No. 2, August 1954, pp. 49 to 58.

"Physical Review," vol. 99, No. 6, Sept. 15, 1955, pp. 1788–1798.